(12) United States Patent
Wang et al.

(10) Patent No.: US 11,687,621 B2
(45) Date of Patent: Jun. 27, 2023

(54) MULTI-MODAL FUSION TECHNIQUES CONSIDERING INTER-MODALITY CORRELATIONS AND COMPUTER MODEL UNCERTAINTY

(71) Applicant: International Business Machines Corporation, Armonk, NY (US)

(72) Inventors: Hongzhi Wang, Santa Bruno, CA (US); Tanveer Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 17/215,734

(22) Filed: Mar. 29, 2021

(65) Prior Publication Data
US 2022/0309295 A1    Sep. 29, 2022

(51) Int. Cl.
*G06F 18/25*    (2023.01)
*G06T 7/00*    (2017.01)
(Continued)

(52) U.S. Cl.
CPC .......... *G06F 18/251* (2023.01); *G06F 18/214* (2023.01); *G06N 20/00* (2019.01);
(Continued)

(58) Field of Classification Search
None
See application file for complete search history.

(56) References Cited

U.S. PATENT DOCUMENTS

| 9,727,824 B2 | 8/2017 | Rose et al. |
| 10,304,006 B2 | 5/2019 | Keshava et al. |

(Continued)

FOREIGN PATENT DOCUMENTS

| JP | 111461176 | * | 7/2020 | |
| WO | WO-2021046477 A1 | * | 3/2021 | ............. G16H 40/63 |

OTHER PUBLICATIONS

Addressing Failure Prediction by Learning; Charles Corbiere (Year: 2019).*

(Continued)

*Primary Examiner* — Nancy Bitar
(74) *Attorney, Agent, or Firm* — Stephen J. Walder, Jr.; Anthony Curro

(57) ABSTRACT

A joint multimodal fusion computer model architecture is provided that receives prediction output data from a machine learning (ML) computer model set comprising a plurality of different subsets of ML computer models operating on input data of different modalities and generating different prediction outputs. Prediction outputs are fused by executing an uncertainty and correlation weighted (UCW) joint multimodal fusion operation on the prediction outputs to generate a fused output providing multimodal prediction output data. The UCW joint multimodal fusion operation applies different weights to different ones of prediction outputs from the different subsets of ML computer models operating on input data of different modalities. The different weights are determined based on an estimation of uncertainty in each of the different subsets of ML computer models and an estimate of a correlation between different modalities.

18 Claims, 4 Drawing Sheets

(51) Int. Cl.
*G06N 20/00* (2019.01)
*G06V 30/194* (2022.01)
*G06F 18/214* (2023.01)

(52) U.S. Cl.
CPC .......... *G06T 7/0012* (2013.01); *G06V 30/194* (2022.01); *G06T 2207/10081* (2013.01); *G06T 2207/10088* (2013.01); *G06T 2207/10116* (2013.01); *G06T 2207/10132* (2013.01); *G06T 2207/20081* (2013.01)

(56) References Cited

U.S. PATENT DOCUMENTS

| | | | |
|---|---|---|---|
| 10,504,020 | B2 | 12/2019 | Trenholm et al. |
| 10,891,741 | B2 | 1/2021 | Saleemi et al. |
| 2018/0217585 | A1* | 8/2018 | Giering ................ G06V 10/454 |
| 2020/0293272 | A1* | 9/2020 | Koppens .............. H03G 3/3005 |
| 2020/0326667 | A1* | 10/2020 | Ahuja ...................... G06N 3/08 |
| 2021/0375441 | A1* | 12/2021 | Aggarwal .............. G06N 3/045 |
| 2022/0019867 | A1* | 1/2022 | Wang ...................... G06N 3/04 |
| 2022/0101087 | A1* | 3/2022 | Lee ..................... G06F 18/2113 |

OTHER PUBLICATIONS

Anonymous, "Conditional Compensatory Multimodal Boosting", IP.com Prior Art Database Technical Disclosure, IP.com No. IPCOM000188110D, Sep. 22, 2009, 3 pages.

Anonymous, "Method and System of Classification of Images Based on Modality", IP.com Prior Art Database Technical Disclosure, IP.com No. IPCOM000218695D, Jun. 6, 2012, 6 pages.

Anonymous, "Method for Training Model for Multiple Modalities", IP.com Prior Art Database Technical Disclosure, IP.com No. IPCOM000261603D, Mar. 20, 2020, 5 pages.

Anonymous, "Method of Transfering Image Interpretation Across Imaging Modalities", IP.com Prior Art Database Technical Disclosure, IP.com No. IPCOM000255331D, Sep. 18, 2018, 6 pages.

Atrey, Pradeep K. et al., "Multimodal fusion for multimedia analysis: a survey", Multimedia Systems (2010), Published online Apr. 4, 2010, 35 pages.

Bakr, Shaimaa et al., "A radiogenomic dataset of non-small cell lung cancer", Scientific Data, Oct. 16, 2018, 9 pages.

Baltrusaitis, Tadas et al., "Multimodal Machine Learning: A Survey and Taxonomy", IEEE Transactions on Pattern Analysis and Machine Intelligence, vol. 41, No. 2, Feb. 2019, 21 pages.

Bugge, Anders S. et al., "Long-term survival after surgical resection for non-small cell lung cancer", European Respiratory Journal 2017, vol. 50, No. suppl 61, Abstract provided, Published online Dec. 6, 2017, 5 pages.

Chang, Shih-Fu et al., "Large-Scale Multimodal Semantic Concept Detection for Consumer Video", MIR'07: Proceedings of the international workshop on Workshop on multimedia information retrieval, Sep. 28-29, 2007, 10 pages.

Clyde, Merlise et al., "Model Uncertainty", Statistical Science, vol. 19, No. 1, Feb. 2004, 14 pages.

Fumera, Giorgio et al., "Performance Analysis and Comparison of Linear Combiners for Classifier Fusion", Proceedings of the Joint IAPR International Workshop on Structural, Syntactic, and Statistical Pattern Recognition, Aug. 2002, 9 pages.

Ho, Tin Kam et al., "Decision Combination in Multiple Classifier Systems", IEEE Transactions on Pattern Analysis and Machine Intelligence, vol. 16, No. 1, Jan. 1994, 10 pages.

Hoeting, Jennifer A., "Bayesian Model Averaging: A Tutorial", Statistical Science, vol. 14, No. 4, Nov. 1999, 36 pages.

Kim, Hyun-Chul et al., "Bayesian Classifier Combination", Proceedings of the 15th International Conference on Artificial Intelligence and Statistics (AISTATS), Apr. 21-23, 2012, 9 pages.

Kittler, J., "Combining Classifiers: A Theoretical Framework", Pattern Analysis & Applications 1(1), 18-27, Jan. 10, 1998, 10 pages.

Kittler, Josef et al., "On Combining Classifiers", IEEE Transactions on Pattern Analysis and Machine Intelligence, vol. 20, No. 3, Mar. 1998, 14 pages.

Lakshminarayanan, Balaji et al., "Simple and Scalable Predictive Uncertainty Estimation using Deep Ensembles", 31st Conference on Neural Information Processing Systems (NIPS 2017), Dec. 4-9, 2017, 12 pages.

Liu, Kuan et al., "Learn to Combine Modalities in Multimodal Deep Learning", arXiv:1805.11730v1 [stat.ML], May 29, 2018, 15 pages.

Muralidaran, Ashok et al., "Long-term survival after lung resection for non-small cell lung cancer with circulatory bypass: A systematic review", The Journal of Thoracic and Cardiovascular Surgery, vol. 142, No. 5, Nov. 2011, 6 pages.

Ngiam, Jiquan et al., "Multimodal Deep Learning", Proceedings of the 28th International Conference on Machine Learning, Jun. 28-Jul. 2, 2011, 8 pages.

Pang, Yanwei et al., "Multimodal Learning for Multi-Label Image Classification", 2011 18th IEEE International Conference on Image Processing, Sep. 9-14, 2011, 4 pages.

Perrin, Richard J. et al., "Multimodal techniques for diagnosis and prognosis of Alzheimer's disease", Nature 461, 916-922 (2009), Oct. 15, 2009, NIH Public Access Author Manuscript, 18 pages.

Pochampally, Ravali et al., "Fusing Data with Correlations", SIGMOD'14, Jun. 22-27, 2014, submitted version arXiv:1503.00306v1 [cs.DB] Mar. 1, 2015, 12 pages.

Poh, Norman et al., "How Do Correlation and Variance of Base-Experts Affect Fusion in Biometric Authentication Tasks?", IEEE Transactions on Signal Processing, vol. 53, No. 11, Dec. 2005, 13 pages.

Ramachandram, Dhanesh et al., "Deep Multimodal Learning: A survey on recent advances and trends", IEEE Signal Processing Magazine, Nov. 2017, 13 pages.

Ruta, Dymitr et al., "An Overview of Classifier Fusion Methods", Computing and Information Systems, 7, Jan. 2000, 10 pages.

Schefzik, Roman, "Ensemble calibration with preserved correlations: unifying and comparing ensemble copula coupling and member-by-member postprocessing", Q.J.R. Meteorol. Soc. 143: 999-1008, Jan. 2017, 10 pages.

Srivastava, Nitish et al., "Dropout: A Simple Way to Prevent Neural Networks from Overfitting", Journal of Machine Learning Research, vol. 15, No. 1, Jun. 2014, 30 pages.

Srivastava, Nitish et al., "Multimodal Learning with Deep Boltzmann Machines", Journal of Machine Learning Research 15 (2014) 2949-2980, Sep. 2014, 9 pages.

Subramanian, Vaishnavi et al., "Multimodal Fusion of Imaging and Genomics for Lung Cancer Recurrence Prediction", 2020 IEEE 17th International Symposium on Biomedical Imaging (ISBI), Apr. 3-7, 2020, 5 pages.

Van Griethuysen, Joost J. et al., "Computational Radiomics System to Decode the Radiographic Phenotype", Cancer Research, vol. 77, No. 21, Nov. 1, 2017, 5 pages.

Wang, Hongzhi et al., "Multi-Atlas Segmentation with Joint Label Fusion", IEEE Trans Pattern Anal Mach Intell., Mar. 2013, Epub Jun. 26, 2012, submitted draft version from Jun. 11, 2012, 30 pages.

Yang, Jun et al., "Harmonium Models for Video Classification", Published online in Wiley InterScience, Jan. 18, 2008, 15 pages.

* cited by examiner

|  | W/0 UNCERTAINTY | WITH UNCERTAINTY |
|---|---|---|
| CT RADIOMICS | 0.514 | 0.531 |
| GENE-EXPRESSION | 0.589 | 0.663 |
| NN INTERM. FUSION | 0.586 | 0.591 |
| NN LATE FUSION | 0.529 | 0.613 |
| UCW MULTIMODAL FUSION | N/A | 0.728 |

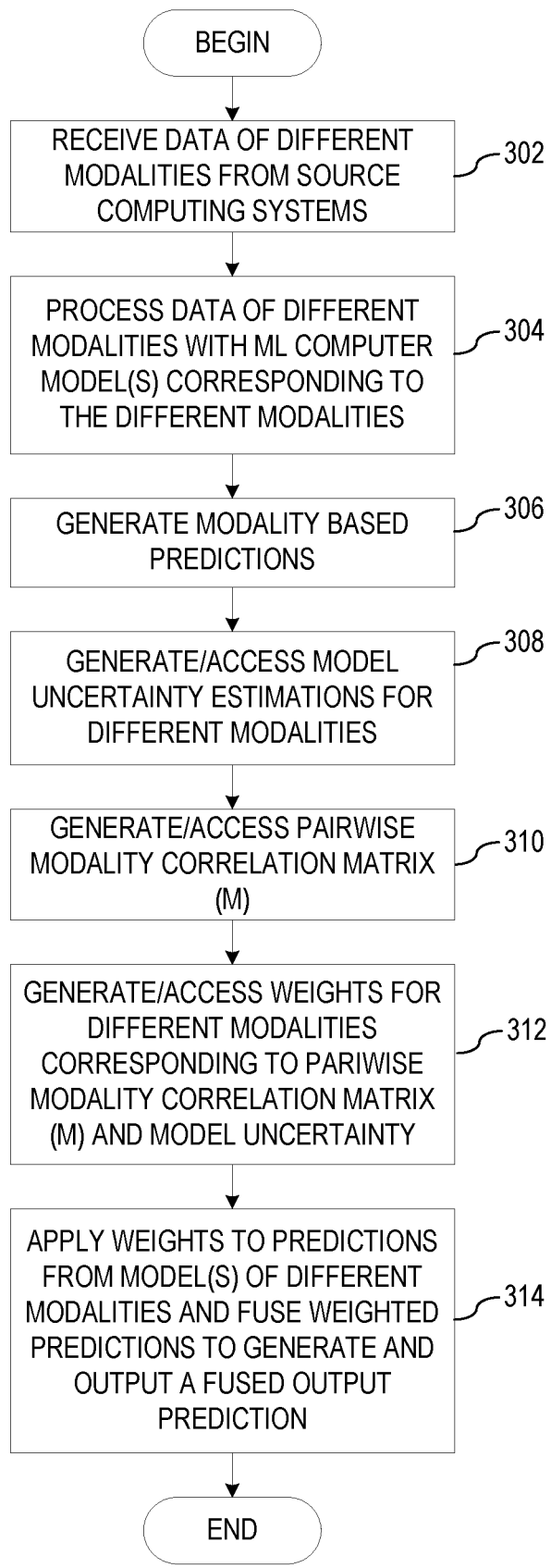

MULTI-MODAL FUSION TECHNIQUES CONSIDERING INTER-MODALITY CORRELATIONS AND COMPUTER MODEL UNCERTAINTY

BACKGROUND

The present application relates generally to an improved data processing system and method and more specifically to an improved multimodal fusion data processing system and improved multimodal fusion data processing system operation for combining data of various modalities taking into consideration inter-modality correlations and computer model uncertainty.

Multimodal fusion is increasingly important in many fields of data processing, such as video analysis and multimodal diagnosis in medical applications, where the "modalities" are any different data types from different sources, such as different sensors, imaging equipment, audio sensors, tactile sensors, or the like. A primary benefit of multimodal analysis is that different modalities may capture complementary information for a particular task and thus, by performing a multimodal a more accurate representation of the data for the particular task is made possible. For example, a magnetic resonance imaging (MRI) study can characterize soft tissues while computerized tomography (CT) provides both soft tissue and bone information for diagnosis. Thus, by combining analysis of both types of imaging studies for a patient, a greater understanding of the patient's medical condition is made possible. Similarly, the fusion of data from various sensors, such as cameras, lidar, and radar, have been sued to perform object detection in autonomous vehicle applications.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions that are executed by the at least one processor to configure the at least one processor to provide a joint multimodal fusion computer model architecture which executes the method. The comprises receiving prediction output data from a machine learning (ML) computer model set comprising a plurality of different subsets of ML computer models. Each subset of ML computer models in the ML computer model set operates on input data of a different modality than input data of other subsets of ML computer models in the ML computer model set. Each subset of ML computer models generates a different prediction output in the prediction output data.

The method further comprises fusing prediction outputs in the plurality of prediction output data by executing an uncertainty and correlation weighted (UCW) joint multimodal fusion operation on the prediction output data to generate a fused output comprising multimodal prediction output data. The UCW joint multimodal fusion operation comprises applying different weights to different ones of prediction outputs from the different subsets of ML computer models operating on input data of different modalities. The different weights are determined based on an estimation of uncertainty in each of the different subsets of ML computer models and an estimate of a correlation between different modalities. Moreover, the method comprises outputting the fused output comprising the multimodal prediction output data to a computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a flowchart outlining an example operation of a multimodal fusion operation in accordance with one illustrative embodiment;

DETAILED DESCRIPTION

Figure 1:
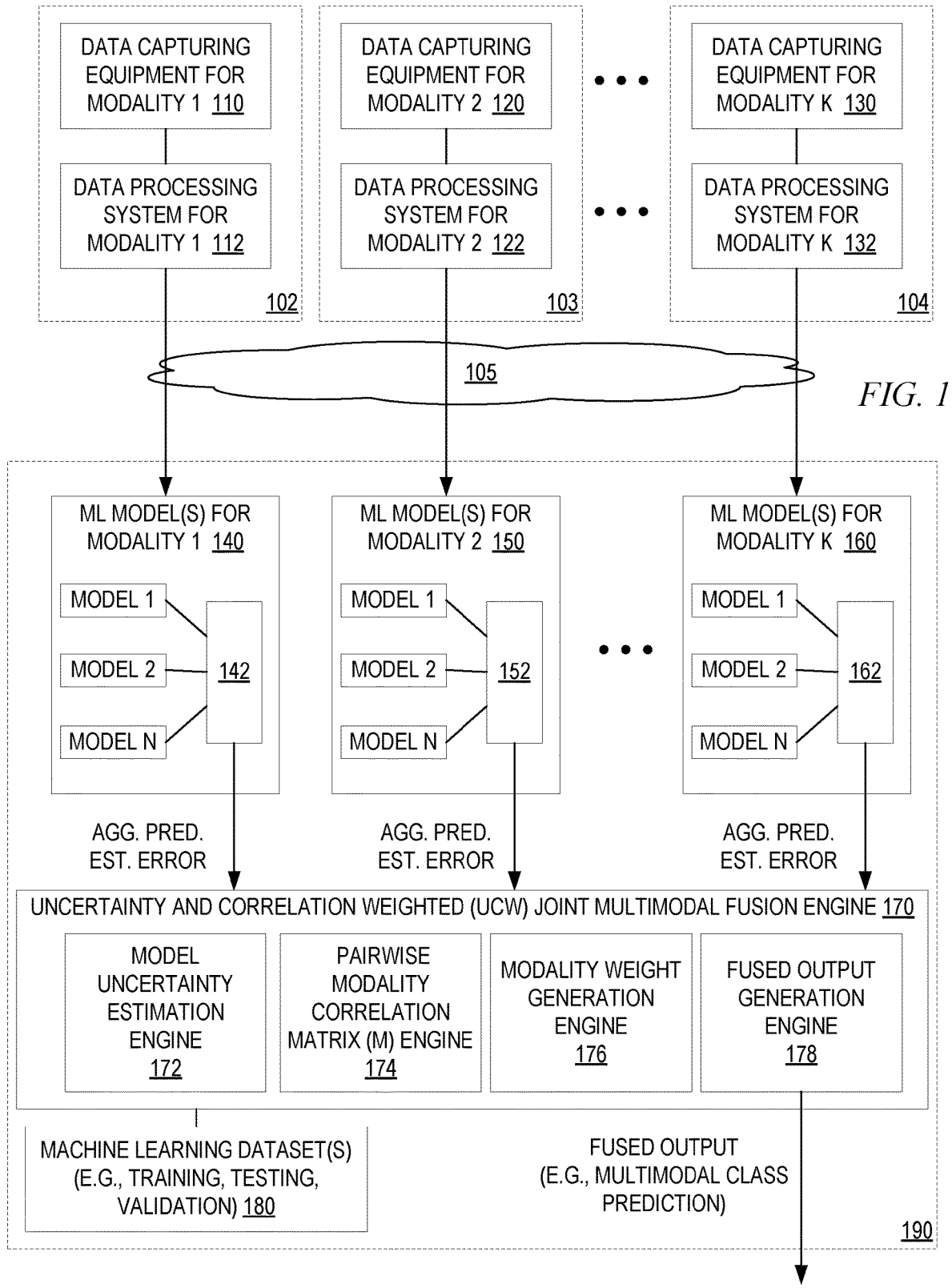
FIG. 1 is an example diagram of a block diagram describing the primary operational elements of an improved multimodal fusion data processing system in accordance with one illustrative embodiment.

Multimodal fusion can be categorized into three main categories: early fusion, late fusion, and hybrid fusion. Early fusion is also known as data fusion, where data from different modalities are combined in their original format, e.g., via concatenation, to generate a concatenated joint representation of all of the data. Machine learning based computer model training is performed directly on the concatenated joint representation of the combined data. Early fusion is mostly applied when various modalities are already aligned in the same semantic feature space. For example, different color channels in Red, Green, Blue (RGB) images all capture the same content but in different light spectrums. A simple concatenation-based joint representation gives a compact and more complete visual representation than any single color channel. For modalities that live in feature spaces with different semantic interpretations, such as images and audio, early fusion is less effective because simple concatenation is often inadequate for features with different semantic interpretations, i.e., more complex data processing is required to get the data to be compatible for model training due to the differences in the data types. For example, a feature transfer step is often required that transfers signals from various modalities into a common semantic feature space before generating the concatenation-based joint representation.

Late fusion, which is also known as decision fusion, is an extreme case where predictions by different computer models, that each operate on data of one or more various modalities, are already made independently and are then concatenated to achieve the fusion result. Any non-late fusion that also requires features transferred into a common semantic feature space before concatenation-based joint representation is referred to as hybrid fusion. Since late fusion is more generally acceptable than early fusion, it has been widely applied for multimodal fusion applications, especially for modalities posing challenges in obtaining meaningful joint representations.

Late fusion has been used in the context of combining classifiers, i.e., non-deterministic machine learning computer models whose function it is to learn associations of features that may then be used to classify input data into a predetermined set of classifications, e.g., a simple example being a classifier that classifies input image data into whether the image is of a "cat" or a "dog," where "cat" and "dog" are the predetermined classifications. When the output of each classifier has probabilistic interpretations, i.e., probability values being calculated for each of the classifications indicating a likelihood that the corresponding classification applies to the input data, the fusion problem becomes inferring the joint probability of multiple variables from the marginalized probability of each individual variable. Under the independent assumption, a product rule or a sum rule can be applied to integrate marginalized probabilities into the joint probability. When probabilistic interpretation is unavailable, the independent assumption leads to the majority voting rule for decision fusion, i.e., the classification that the majority of computer models indicate to be the correct classification wins over other potential classifications. Although the independent assumption between classifiers greatly simplifies fusion, it often oversimplifies the problem and produces sub-optimal solutions.

An improved solution needs to take the correlations between different classifiers into account. For instance, when sufficient training data is available, logistic regression can be applied to implicitly capture the relations between different classifiers and learn a linear combination rule for integrating classifiers. In another example, pairwise correlations between classifiers may be estimated by comparing dissimilarities between testing data and the training data used by each classifier. When classifier correlations can be reliably estimated, the fused solution greatly outperforms those obtained by ignoring the correlations.

A limitation of existing late fusion techniques is that model uncertainty is not considered when performing the fusion operation. Since many problems are underdetermined due to insufficient training data, it is common that the model parameters of a trained computer model, such as a neural network or other artificial intelligence computer model trained through a machine learning process (e.g., a classifier computer model (or simply a "classifier"), perfectly fit the training data and are not unique. Among all feasible solutions, some generalize better than others. This uncertainty problem means that any specific trained classifier may be inaccurate in modeling the classification problem. Since each modality is represented by separate classifiers in a multimodal classification case, the overall multimodal fusion performance may be compromised if the uncertainties of the classifiers are not properly addressed.

The mechanisms of the illustrative embodiments provide an improved computing tool and improved computing tool operations that perform analysis on computer model uncertainty and its relation to multimodal fusion. The improved computing tool and improved computing tool operation comprises a joint multimodal late fusion algorithm that explicitly takes inter-modality correlations into account for multi-modal fusion. In taking into consideration the inter-modality correlations, the illustrative embodiments provide an improved weighted averaging based late fusion computing tool and improved weighed averaging based late fusion computing tool operation that accounts for both machine learning computer model uncertainty and modality correlations in the weight assignments.

Before discussing the improved computing tool mechanisms and improved computing tool operations of illustrative embodiments in greater detail, it is first important to understand uncertainty in the case of predictions from machine learning computer models (or simply "models"), e.g., classifiers, that operate on a single modality. Due to model uncertainty, any prediction made by a machine learning computer model may be prone to errors. By quantifying such uncertainty as the expectation of produced errors, the goal of multimodal fusion is to reduce the uncertainty in the fused result. This can be achieved by weighing the prediction made by each model, or subset of one or more models, associated with each modality according to its uncertainty such that more certain predictions contribute more to the fused result. A fusion operation that captures model uncertainty in a single-modality, and determines correlations between predictions made across modalities, is provided based on the improved weighting mechanisms of the illustrative embodiments.

For example, consider the following explanation of model uncertainty and expected error produced by a single modality. Let $D=\{x_i, y_i\}_{i=1}^n$ be training data from a single modality, i.e., data of a single data type whether from the same source or different sources, and $T=\{t_j\}_{j=1}^m$ be testing data. For example, in an illustrative embodiment in which the input data is medical imaging data, the single modality may be a type of data from a particular type of imaging technology, e.g., Computed Tomography (CT) scan imaging data, Magnetic Resonance Imaging (MRI) data, sonogram data, X-Ray, etc. The data represents images captured of a biological subject and have data types and formats that are specific to the particular imaging technology, such that different imaging technology represents different modalities or types of data. In other illustrative embodiments, the modalities may be even more disparate, such as image data being a first modality, audio data being a second modality, weather data (e.g., barometric pressure, temperature, humidity, etc.) being a third modality, textual data from natural language processing of electronic documents being a fourth modality, etc. It should be appreciated that the particular data is obtained from corresponding computer technology designed to capture the data of the particular modality, e.g., CT imaging equipment, MRI imaging equipment, audio capture sensors, weather sensing equipment, etc. The training data is data that is labeled with correct classification results such that a machine learning process may be applied to a computer model using the training data and appropriate modifications of operational parameters of the machine learning computer model may be made over iterations and epochs so as to minimize an error in the computer model's generated results. Testing data is similar to training data but is used to test the trained computer model to determine performance metrics for the trained computer model.

In this case, $x_i$, $t_j \in \mathbb{R}^L$ are features extracted from the input data which are used as a basis for the classification performed by the machine learning computer model, i.e., classifier. In addition, $y_i$ is the label for $x_i$, where the "label" is the correct classification output that the classier should generate when properly classifying the input data. Let U be a learning model and θ be a model parameter that perfectly fits the training data, i.e. generates correct predictions for the training data. Model uncertainty arises when model parameters that best fit the training data (i.e., generates correct predictions with the least error) are not unique, which is a typical underdetermined problem. For example, a simple classifier may have two parameters and applies the following rule for making predictions, y=a*x+b, where a and b are the two model parameters, x is the feature, and y is the class label. If only one training data is given, e.g., (x=1,y=1), then the solution for a and b that enables the classifier to make correct prediction for the training data is not unique. For instance, both (a=0,b=1) and (a=1,b=0) can produce the correct prediction for the training data.

Let $\Theta_D$ be the set of model parameters that fit, i.e., produce correct predictions for, the training data and $\Theta_{D,T}$ be the set of desired model parameters that fit both the training data and the testing data. Then, $\Theta_{D,T} \subseteq \Theta_D$. For a testing sample $t_j$, the expected label prediction produced by the model U can be estimated under the Bayes rule by:

$$p(y=l|t_j,D,U)=\int_{\theta \in \Theta_D} \delta(U(t_j,\theta)=l)p(\theta|D,U) \quad (1)$$

where δ(•) is an indicator function, e.g., a function defined on a set X that indicates membership of an element in a subset A of X, having a value of 1 for all elements of A and a value of 0 for all elements of X not in A.

Note that any θ outside the desired solution space $\Theta_{D,T}$ contributes errors in the above expected prediction estimation, where the expected prediction error is:

$$e(t_j,D,U)=\int_{\theta \in \Theta_D \setminus \Theta_{D,T}} \delta(U(t_j,\theta) \neq y(t_j))p(\theta|D,U) \quad (2)$$

The overall testing error can be quantified by:

$$E(T,D,U)=\Sigma_{t_j \in T} e(t_j,D,U) \quad (3)$$

The distribution of the expected probabilities p(θ|D, U) is a key component determining the overall testing error, as shown in equation (3) above, which is conditioned on two factors: training data D and the model U. On the data side, representative training data usually leads to small testing errors. However, training data not correctly reflecting the true distribution of the real data may lead to biased predictions with large testing errors. On the model side, both model complexity and model optimization may have significant impact. For instance, overly complex models may have even larger solution spaces $\Theta_D$, further reducing the chance of producing desired models. Similarly, less effective optimization may lead to larger misalignment between p(θ|D, U) and the desired model parameter distribution, resulting in larger testing errors.

The above equations (1)-(3) are provided to describe model uncertainty in a single modality. In late fusion, learning models are trained for each modality independently. For example, let K be the total number of modalities of data collected for a particular late fusion machine learning model based application. Let $D^k$ and $U^k$ be the training data and the machine learning computer model for the $k^{th}$ modality, respectively. To integrate the predictions made by machine learning computer models for all available modalities, consider a weighted averaging late fusion technique in accordance with one illustrative embodiment. The fused label (i.e., fused prediction or fused output) distribution for a testing sample $t_j=(t_j^1, \ldots, t_j^K)$ is:

$$p(y=l|t_j)=\Sigma_{k=1}^{K} w^k p(y=l|t_j^k, D^k, U^k) \quad (4)$$

where $w^k$ is a weight assigned for the prediction made by the $k^{th}$ modality with $\Sigma_{k=1}^{K} w^k = 1$. The expected error produced by the fused prediction is:

$$e(t_j)=\Sigma_{k=1}^{K} w^k e(t_j^k, D^k, U^k) \quad (5)$$

The goal of fusion is to choose weights that minimize the squared sum of expected error over testing data:

$$w^* = \text{argmax}_w \Sigma_j e(t_j)^2 = \text{argmax}_w w^T M w, \text{ subject to}$$
$$\Sigma_{k=1}^{K} w^k = 1 \quad (6)$$

where M is a matrix capturing the pairwise correlation between predictions made by different modalities, with:

$$M[k_1,k_2]=\Sigma_j e(t_j^{k1}, D^{k1}, U^{k1}) e(t_j^{k2}, D^{k2}, U^{k2}) \quad (7)$$

and w* is a vector of weights $[w^1 \ldots w^k]$. A closed-form solution to equation (6) is $$w^* = \frac{M^{-1} 1_K}{1_K^T M^{-1} 1_K},$$

where $1_K$ is a vector of size K and each element in the vector equals 1. Note that this technique handles missing modalities well as the pairwise modality correlation matrix M is constructed for only modalities available to a testing data set. For example, consider an example in which there are three modalities and a matrix M of the type:

$$M = \begin{bmatrix} 0.2 & 0.1 & 0.1 \\ 0.1 & 0.4 & 0.2 \\ 0.1 & 0.2 & 0.6 \end{bmatrix}.$$

If the weights vector w is used to combine the models trained for the three modalities, the total error produced by the combined result can be calculated as $w^T M w$, which is a single value. The goal is to find the optimal weights that minimizes the total error, i.e., $w^T M w$. The weights w that minimizes $w^T M w$ in this example are $$w = \begin{bmatrix} 0.7 \\ 0.2 \\ 0.1 \end{bmatrix},$$

which can be calculated using $$w^* = \frac{M^{-1} 1_K}{1_K^T M^{-1} 1_K}$$

as noted above. That is, the optimal weight for the first modality is 0.7, and the weights for the second and the third modalities are 0.2 and 0.1, respectively. Note that the summation of all weights equals 1.

Estimating the pairwise modality correlation involves using the ground truth label of the testing data, which is unknown during training of the machine learning computer models. To address this problem, the pairwise modality correlation matrix M may be estimated based on validation data for which ground truth labels are available. The validation data is different from testing data as the validation data has manually curated labels and the labels can be used during training for verifying how good the trained model is. Using the validation data, the model produced during training that gives the best results for the validation data is chosen as the finalized trained model. Testing data does not necessarily have manually curated labels. Even if some testing data may have manually curated labels, testing data are not used during training at all. They can be used to evaluate how good the finalized trained model really is.

Estimating M, in one illustrative embodiment, involves sampling the machine learning computer model solution space for each modality. That is, after a deep ensemble method is performed, random sampling is applied to the output results of the ensemble. The deep ensemble method was proposed in Balaji Lakshminarayanan et al., "Simple and Scalable Predictive Uncertainty Estimation Using Deep Ensembles," in Advances in Neural Information Processing Systems, 2017, pp. 6402-6413. The goal of the deep ensemble approach is to estimate how reliable a machine learning model is. Since the trained model produced using the same training method and the same training/validation data can be different after each training process, the deep ensemble method estimates how different these separately trained models are and uses that estimate to determine the reliability of the trained models.

With regard to the random sampling, as an example, given N as the number of random samplings for estimating M, N machine learning computer models, e.g., classifiers, are independently trained for each modality with random initializations. Using the random model sampling approach, the expected prediction error in equation (2) above is estimated by:

$$e(v_j, D, U) = \frac{\sum_{i=1}^{N} \delta(U(v_j, \theta_i) \neq y(v_j))}{N} \quad (8)$$

Where $v_j$ refers to a validation data sample, similar to $t_j$ referring to the testing data sample as noted previously.

Based on the estimate of the expected prediction error (equation (8) above) for each modality, the pairwise correlation values of each entry in M according to equation (7) above may be calculated and stored in the pairwise modality correlation matrix M data structure, e.g., each row of the matrix may correspond to a first modality and each column of the matrix may correspond to a second modality, such that the cell at the intersection stores the pairwise correlation values. The pairwise correlation values in the matrix M indicate a level of correlation between the machine learning computer model predictions for combinations of modalities, i.e., the values provide an indication of how likely machine learning computer models are to generate similar errors in predictions. Thus, for example, if a pairwise correlation value is relatively high compared to other pairwise correlation values, or with regard to a predetermined threshold value, then there is a high correlation between the machine learning computer models for the two modalities such that if one machine learning computer model generates an erroneous result, the other is likely to generate a similar erroneous result. If a pairwise correlation value is relatively low, then the machine learning computer models are not as correlated and thus, the models have a lower probability of generating similar levels of error in their predictions.

While some illustrative embodiments may utilize a random sampling approach as discussed above, in some implementations this may be a computationally expensive approach. Thus, in other illustrative embodiments, machine learning computer model uncertainty estimations may involve other types of approaches that prevent overfitting of the model to the data, such as performing dropout modeling, for example. Any suitable sampling or model regularization methodologies that prevent overfitting may be used without departing from the spirit and scope of the illustrative embodiments.

Thus, the pairwise modality correlation matrix M may be estimated from the validation data and used with equation 6 to generate a vector of weight values, each weight value being associated with a different modality. The pairwise modality correlation matrix M is a K×K matrix where each element in M stores one or more values indicating how each pair of modalities is correlated in terms of producing errors. For example, if there are three modalities, i.e., K=3, then M is a 3×3 matrix and by solving equation (6) above, the weights for each of the three modalities may be determined at approximately the same time.

The weight values determined in this manner take into consideration the correlation of the different modalities in their predictions and the errors, or uncertainty, in their predictions. The vector of weights is then used to configure the late fusion computer model, which receives outputs from one or more machine learning computer models associated with a plurality of different modalities and generates a fused output representing a prediction based on data of different modalities. It should be appreciated that, for each modality there may a single machine learning computer model or an ensemble of machine learning computer models whose individual outputs may be aggregated to generate an aggregated prediction to which a corresponding weight value from the weight vector may be applied when generating the fused output. The fused output itself may be any weighted combination of the predictions generated by the machine learning computer models for the different modalities. In one illustrative embodiment, the weighted combination may comprise a weighted averaging of the predictions generated for each of the modalities, however any other weighted combination of the predictions may be used as will be appropriate for the particular implementation desired.

As set forth above, the illustrative embodiments provide an improved computing tool and improved computing tool operation that is specifically directed to a late fusion computer model which, when generating the fused output, weights the predictions from different modality machine learning computer models in accordance with a determination of the correlation and uncertainty in predictions generated by machine learning computer models of different modalities. The result is an improved performance, such as in terms of accuracy of the predicted classifications generated, of a late fusion computer model.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, the illustrative embodiments provide an improved computing tool and improved computing tool operation that provides an improved multimodal fusion machine learning computer model. In particular, the illustrative embodiments provide the improved computing tool and improved computing tool operation in an improved multimodal fusion data processing system and improved multimodal fusion data processing system operation for combining data of various modalities, such as in the case of a late fusion approach, taking into consideration intermodality correlations and machine learning computer model uncertainty, as previously discussed above.

FIG. 1 is an example diagram of a block diagram describing the primary operational elements of an improved multimodal fusion data processing system in accordance with one illustrative embodiment. As shown in FIG. 1, a joint multimodal fusion computer model architecture 190 is provided that includes an uncertainty and correlation weighted (UCW) joint multimodal fusion engine 170. The UCW joint multimodal fusion engine 170 comprises a model uncertainty estimation engine 172, a pairwise modality correlation matrix (M) engine 174, a modality weight generation engine 176, and a fused output generation engine 178. The elements 172-176 operate to determine weights to be applied to outputs generated by machine learning computer models for different modalities. These weights are determined based on a computerized evaluation and calculation of the uncertainty in, and pairwise correlations between, machine learning computer model outputs for various different modalities.

It should be appreciated that the operations of elements 172-176 as described herein may be implemented during a training or configuring operation such that the weights for different modalities may be determined at a time different from, and prior to, runtime operation on new data coming from source computing systems. In such a case, the runtime operation of the fused output generation engine 178 may retrieve the previously determined weights from a weight vector data structure, such as may be generated by the modality weight generation engine 176 and provided and/or stored by the fused output generation engine 178, the weight vector data structure comprising a different weight for each of a plurality of different modalities. It should be appreciated that while a different weight is associated with each of the modalities, the actual weight values, in some cases may be the same, e.g., two different weights may have the same weight value, e.g., a weight vector data structure may have three different weights with the following weight values {0.2, 0.2, 0.6}.

The retrieved weights may be applied to the outputs received from the various machine learning computer models, e.g., machine learning models 140-160 in FIG. 1, such that each output corresponding to a different modality k, in a total number of modalities K, has a different weight $w^k$ applied to it as part of the fused output generation, e.g., a fused label or predicted classification output. The weighted outputs may then be combined or aggregated according to any desired methodology to generate a fused output, e.g., the weighted outputs may be averaged to generate a weighted average of the individual outputs for the various modalities.

To illustrate the operation of the joint multimodal fusion computer model architecture in accordance with one illustrative embodiment, as shown in FIG. 1, a plurality of different modality data may be obtained from source computing systems 102-104. Each of the source computing systems 102-104 may comprise corresponding data capturing equipment 110, 120, and 130 which may comprise sensors, imaging equipment, computer applications, and/or the like, i.e., any mechanism that is capable of obtaining raw data of a particular modality. The source computing systems 102-104 may further include local data processing systems 112, 122, and 132 that process the raw data from the data capturing equipment 110, 120, and 130, and generate output data representing data of a particular modality. In accordance with the illustrative embodiments, a plurality of different modalities are operated on, with the number of modalities being any desired number from 2 to K number of modalities of different types.

As an example, a first modality may be a CT image having data specifying Hounsfield values for pixels of one or more captured medical images of a patient, where the Hounsfield value specifies the radiodensity of anatomical structures, and a second modality may be a sonogram image where the values measure the intensity of the reflected sound wave giving an indication of the density of the tissues within the patient. In another example, a first modality may be an image, a second modality may be audio data, and a third modality may be weather information. Any combination of 2 or more modalities of data may be used without departing from the spirit and scope of the present invention.

For a source computing system 102, the data capturing equipment 110 for a first modality provides the captured raw data to the data processing system 112 for that modality which performs an initial processing of the data to generate modality data that is provided to the joint multimodal fusion computer model architecture 190, potentially via data network(s) 105. The same is true for the other modality source computing systems 103 and 104. It should be appreciated what while FIG. 1 shows these source computing systems 102-104 as separate computing systems, one or more of these source computing systems may be integrated with one another, such that a single source computing system may provide different separate data sets for different modalities. Moreover, while FIG. 1 shows the source computing systems 102-104 to be separate from a computing system providing the joint multimodal fusion computer model architecture 190, one or more of the source computing systems 102-104 may be integrated with the computing system providing the joint multimodal fusion computer model architecture 190 such that transmission of the modality data need not be performed across the network(s) 105 for each modality. Of course, any combination of local and remote source computing systems and joint multimodal fusion computer model architecture computing system may be used without departing from the spirit and scope of the present invention.

The different modality data sets from the source computing systems 102-104 are received, potentially via the network(s) 105, by the joint multimodal fusion computer model architecture 190 and input to their respective trained machine learning computer models 140-160 for the corresponding modalities. The trained machine learning computer models 140-160 are trained through machine learning processes to perform a corresponding operation on the input modality data sets and generate a corresponding output based on processing of features extracted from the input modality data sets. The trained machine learning computer models may be any machine learning computer model, such as a neural network (NN), convolutional neural network (CNN), deep learning neural network (DNN), random forest machine learning model, K nearest neighbor, support vector machine, decision tree, other linear regression or logistic regression based computer models, or the like. The trained machine learning computer models 140-160 may each comprise one or more trained machine learning computer model. For example, each trained machine learning computer model 140-160 may comprise an ensemble of machine learning computer models, e.g., ensemble of 1 to N machine learning computer models in each of 140-160. It should be appreciated that while FIG. 1 shows each of machine learning computer model(s) 140-160 having N individual machine learning computer models in an ensemble, it is not necessary that each of 140-160 have the same number of individual machine learning computer models. However, if an ensemble is utilized, then the outputs of each individual machine learning computer model are combined by a corresponding aggregator 142, 152, or 162 so as to generate an aggregated output, e.g., aggregated prediction, and an estimated expected error for the corresponding ensemble.

Assuming, for purposes of illustration only, that each of the models of each machine learning computer model 140-160 implements a neural network type architecture, the machine learning computer models 140-160 for the different modalities perform artificial intelligence operations on the input modality data set corresponding to its modality to thereby extract features from the input data set, process those features through layers of the neural network architecture to draw inferences from the features, and generates an output representing a prediction corresponding to the input data set. This prediction may take many different forms depending on the purpose and functionality for which the machine learning computer model is configured. As an example, and for purposes of illustration only, the various machine learning computer models 140-160 may be considered to be classifiers, as previously described above, and operate to classify the input data set into one of a plurality of different predefined classifications. These predefined classifications may be the same across the different machine learning computer models 140-160 with each separate machine learning computer model 140-160 generating predicted classifications from the view of the particular modality of the data set that the particular machine learning computer model 140-160 operates on. For example, machine learning computer model 140 may generate a predicted classification based on a CT image data set, machine learning computer model 150 may generate a predicted classification based on an input audio data set, and machine learning computer model 160 may generate a predicted classification based on a weather input data set.

The prediction outputs from the various machine learning computer models 140-160 are provided to the uncertainty and correlation weighted (UCW) joint multimodal fusion engine 170. As noted above, the UCW joint multimodal fusion engine 170 comprises elements 172-176 for generating a weight vector comprising weight values for each of the different K modalities, thus the weight vector comprises K weight values, based on the uncertainty of the machine learning computer models 140-160 and the pairwise modality correlations, with a pairwise modality correlation matrix M being estimated based on a validation dataset during training/configuring of the machine learning computer models 140-160 and/or UCW joint multimodal fusion engine 170. The UCW joint multimodal fusion engine 170 further includes a fused output generation engine 170 which applies the weights to the various predictions from the machine learning computer models 150 to generate a weighted combination of the predictions as a fused output, such as a fused multimodal classification prediction which is then output as the final predicted output of the joint multimodal fusion computer model architecture 190, e.g., if the joint multimodal fusion computer model architecture 190 is configured to classify input data with regard to a prediction of whether a patient is likely to encounter a particular event, e.g., hospitalization, loss of an extremity, etc., within a given time, the final predicted output would indicate the likelihood of this event occurring.

The UCW joint multimodal fusion engine 170 shown in FIG. 1 is a late fusion based model where, as previously discussed above, the machine learning computer models 140-160 are trained for each modality independently, with their being K modalities, where K is greater than 1. In one illustrative embodiment, the fused output generation engine 178 of the UCW joint multimodal fusion engine 170 combines the weighted outputs of the various machine learning computer models 140-160 using a weighted averaging fusion algorithm, as previously discussed above with regard to equations (4)-(6). As previously discussed above, the pairwise modality correlation matrix M is generated based on a labeled dataset, such as a validation dataset, and captures the pairwise correlation between predictions made by different modalities. The pairwise modality correlation matrix engine 174 may estimate the matrix M by sampling all feasible machine learning computer models for each modality. That is, after a deep ensemble method is performed for each of the machine learning computer models 140, 150, and 160, random sampling is applied to the output results of the ensemble. Given N as the number of random samplings for estimating M, N machine learning computer models, e.g., classifiers, are independently trained for each modality, i.e., models 1-N in each of 140, 150, and 160 with random initializations. That is, each of models 1, 2, . . . , N in each of 140, 150, and 160 have their operational parameters randomly initialized and the models 1-N are then trained through a machine learning process based on the same training dataset. Because of the differences in the initialization of these models 1-N the resulting trained operational parameters will be somewhat different from each other across the models 1-N even though each of the models 1-N are separate instances of the same overall computer model, e.g., different instances of a neural network with different randomly generated initializations.

Using this random model sampling approach, the expected labeled (classification) prediction in equation (1) is estimated. The model uncertainty estimation engine 172 may estimate the expected prediction error in equation (2) using equation (8) above. Based on the estimate of the expected prediction error (equation (8) above) for each modality, the pairwise correlation values of each entry in the pairwise modality correlation matrix engine 174 may calculate entries in the pairwise modality correlation matrix M data structure according to equation (7) above. As mentioned above, the pairwise correlation values in the matrix M indicate a level of correlation between the machine learning computer model predictions for combinations of modalities, i.e., the values provide an indication of how likely machine learning computer models are to generate similar errors in predictions, whereas the uncertainty evaluation from the model uncertainty estimation engine provides an indication of how well each individual model 140-160 performs in generating accurate predictions. Thus, models 140, 150, or 160 that generate more accurate results are given higher weightings by the modality weight generation engine 176 and models 140, 150, or 160 that are highly correlated will have their weights adjusted according to the relative uncertainty estimations.

For example, in a first example A, if model 140 has higher uncertainty than model 150 and model 160, and none of the models are correlated, then model 140 will receive larger weights than model 150 and model 160. As another example, i.e., example B, assume that the model uncertainty for models 140, 150, and 160 are identical to those in example A above. However, model 140 and model 150 are correlated, while neither model 140 nor model 150 are correlated with model 160, then the total weights assigned to model 140 and model 150 in example B are smaller than the total weights assigned to model 140 and model 150 in example A. Recall that the total weights assigned to all models sum up to 1 in the example embodiments.

Thus, for example, if a pairwise correlation value is relatively higher compared to other pairwise correlation values, or with regard to a predetermined threshold value, then there is a higher correlation between the machine learning computer models for the two modalities such that if one machine learning computer model generates an erroneous result, the other is likely to generate a similar erroneous result. If a pairwise correlation value is relatively lower, then the machine learning computer models are not as correlated and thus, the models have a lower probability of generating similar levels of error in their predictions.

Thus, the pairwise modality correlation matrix engine 174 generates a pairwise modality correlation matrix M from the validation dataset 180. The modality weight generation engine 176 uses the matrix M with equation 6 to generate a vector of weight values, each weight value being associated with a different modality. The weight values determined in this manner take into consideration the correlation of the different modalities in their predictions and the errors, or uncertainty, in their predictions. The vector of weights is then used to configure the fused output generation engine 176, which receives outputs from the machine learning computer models 140-160 and generates a fused output representing a prediction based on data of different modalities. The fused output itself may be any weighted combination of the predictions generated by the machine learning computer models for the different modalities. In one illustrative embodiment, the weighted combination may comprise a weighted averaging of the predictions generated for each of the modalities, however any other weighted combination of the predictions may be used as will be appropriate for the particular implementation desired.

The fused output may be provided to a downstream or a requesting computing system for further processing and/or presentation of results to a user. For example, a user may submit a request to generate a prediction for a particular set of multimodal data, e.g., the modality datasets of the various source computing systems 102-104, via their client computing device. The illustrative embodiments may then be employed to generate this prediction by evaluating the datasets of the various modalities and performing a UCW joint multimodal fusion of the predictions from the various modalities. The resulting fused output may then be provided back to the client computing device as the requested result, which may then be presented on the client computing device to the user. Alternatively, the final fused output result may be stored or provided to a downstream computing system which may perform other processing of the fused output depending on the particular implementation.

Thus, the illustrative embodiments provide an improved computing tool and improved computing tool operation that is specifically directed to a late fusion computer model which, when generating the fused output, weights the predictions from different modality machine learning computer models in accordance with a determination of the correlation and uncertainty in predictions generated by machine learning computer models of different modalities. The result is an improved performance, such as in terms of accuracy of the predicted classifications generated, of a late fusion computer model.

To demonstrate the improved performance of a late fusion model in accordance with one illustrative embodiment, mechanisms of one illustrative embodiment were implemented in an experimental study on a task of predicting, based on imaging data (modality 1) and genetic data (modality 2), whether a Non-Small Cell Lung Cancer (NSCLC) patient would survive over one year after receiving surgical resection. In this experimental study, a NSCLC Radiogenomics dataset was used that had both CT imaging and gene expression data for 130 patients with NSCLC. Patients that underwent adjuvant/neo-adjuvant therapy in addition to surgical resection were removed to avoid any influence of non-surgical intervention mechanisms on cancer growth suppression resulting in 107 patients whose data was used the experimental study. With this Radiogenomics dataset, gene expression (RNA sequencing) data was available for 5268 genes. For CT data, nodule masks were provided for each patient, based on which texture and intensity patterns of the nodule and its immediate surrounding tissues of the lung were extracted using a standard radiomics library. The extracted radiomics data comprises a 107-dimensional feature set.

For consistent comparison between different methods, fully connected neural networks (NN) were employed as the base model for each methodology being compared. For single-modality based classification, a neural network with two hidden layers was found experimentally to work well for both gene expression features and CT features. There were 100 and 20 nodes in the first and second hidden layers, respectively. The sigmoid activation function was applied for each layer. For multimodal fusion, the NN-based intermediate fusion and late fusion were tested to provide benchmark results. For NN-based intermediate fusion, the feature of each modality was first transferred into a 50-dimensional feature vector via one fully connected layer. The transferred features were then concatenated and connected to the final prediction layer via a hidden layer with 20 nodes. For NN-based late fusion, the outputs of the above two single-modality base models were concatenated and then connected to the output layer, which applies a logistic regression type approach for combining predictions produced by each single modality network. Both intermediate and late fusion models were trained end-to-end.

A 4-fold cross validation experiment was conducted to test fusion. In each fold test, 60-15-25 data splits were applied for training, validation and testing, respectively. For this test, using the UCW joint multimodal fusion mechanisms of the illustrative embodiments, N=50 was applied for random model sampling based pairwise modality correlation estimation. To show the importance of addressing model uncertainty, the performance produced by deep ensemble for each baseline method was included as baseline performance as well. For deep ensemble, N=50 classifiers were independently trained for each method, e.g., using CT radiomics alone, using gene-expression alone, using a neural network intermediate fusion, using a neural network late fusion, and using a UCW multimodal fusion according to an illustrative embodiment of the present invention.

The label prediction produced by deep ensemble for each testing sample was then computed. For evaluation, the area under curve (AUC) of the receiver operating characteristic (ROC) curve was reported for each method. Since each patient was used for testing once in cross-validation, the AUC was calculated using the entire dataset by merging testing results from all cross validation tests.

Figures 2, 4:
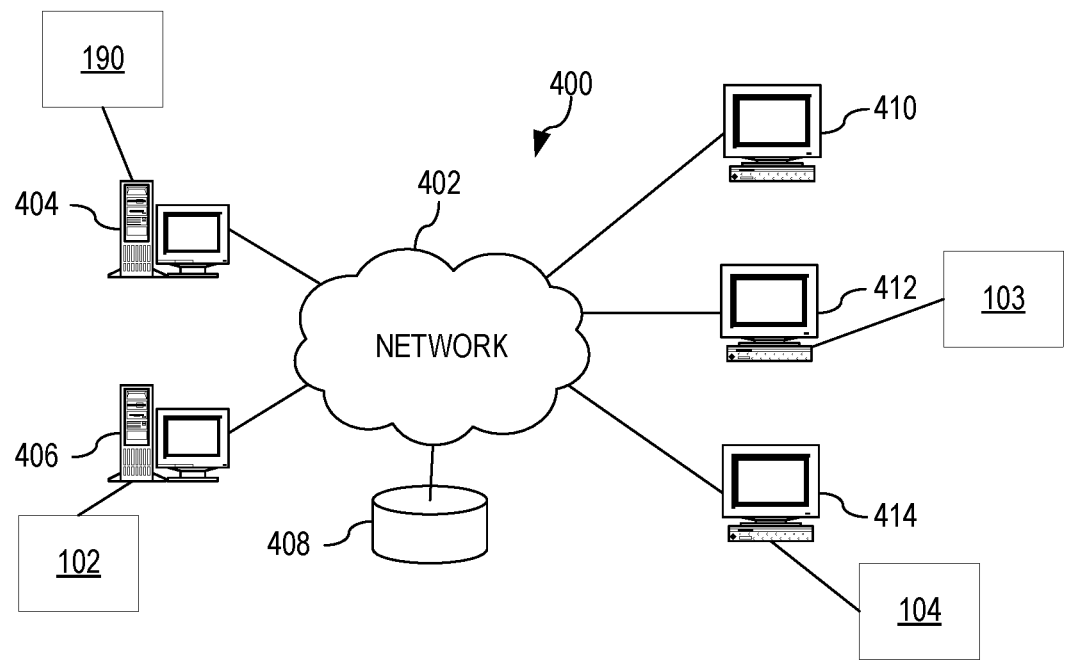
FIG. 2 is a table illustrating experimental results indicating that the multimodal fusion mechanisms of the illustrative embodiments provide an improved result over other approaches.
FIG. 4 is an example diagram of a distributed data processing system in which aspects of the illustrative embodiments may be implemented.

FIG. 2 is a table illustrating experimental results indicating that the multimodal fusion mechanisms of the illustrative embodiments provide an improved result over other approaches. The table in FIG. 2 summarizes the performance for one year survival classification produced by each method. The results shown in FIG. 2 indicate that the gene-expression features are more discriminative than the radiomics CT image features for the survival predication task. Neither NN intermediate fusion nor NN late fusion produced improvement over using the gene-expression feature alone. By taking model uncertainty into account, the deep ensemble approach produced consistent improvement for each baseline method. These results confirm that any single trained classifier can be unreliable due to model uncertainty. Taking all potential classifiers into account gives more robust performance. The proposed late fusion method produced the best AUC of 0.728. This result shows that the UCW joint multimodal fusion mechanisms of the illustrative embodiments can perform well even with a small training dataset.

FIG. 3 is a flowchart outlining an example operation of a multimodal fusion operation in accordance with one illustrative embodiment. The operation outlined in FIG. 3 may be executed by a joint multimodal fusion computer model architecture, such as 190 in FIG. 1, for example, based on datasets obtained from different modality computing system sources. The operation outlined in FIG. 3 is specific to computer technology and specific to an improved computing tool of one illustrative embodiment. The operation assumes a dynamic determination of the weight vector based on an evaluation of the uncertainty and pairwise modality correlations, however in other illustrative embodiments, the steps used to dynamically determine the weight vector, i.e., steps 308-312, may be performed a priori and the resulting weight vector data structure used to configure the fused output generation engine 178 to apply the weights to predictions from the different modality machine learning computer models.

As shown in FIG. 3, the operation starts with the joint multimodal fusion computer model architecture receiving data of different modalities from one or more source computing systems (step 302). The data of different modalities is process with corresponding machine learning computer models, or ensembles of machine learning computer models with randomized initialization, which have been trained, through machine learning training, to generate predictions from features extracted from the input data of the corresponding modality (step 304). The machine learning models each generate corresponding predictions based on their corresponding modalities (step 306).

The UCW joint multimodal fusion engine then generates/accesses model uncertainty estimations for the different modalities (step 308) and the pairwise modality correlation matrix M (step 310). These generations/accesses may be performed, for example, using the model uncertainty estimation engine 172 and pairwise modality correlation matrix engine 174 in FIG. 1, for example. Based on the uncertainties and pairwise modality correlation matrix, the weights for different modalities are generated (step 312) or if these weights have already been generated in a prior operation, they may be accessed via a stored weight vector data structure. The generated/accessed weights are then applied to the predictions from the various different modality machine learning computer models and the weighted predictions are fused to generate a fused output prediction (step 314). The operation then terminates.

As is apparent from the above, the illustrative embodiments are specifically directed to computer technology and providing an improved computer tool specifically directed to addressing issues arising out of computer technology, namely multimodal fusion computer model technology. Thus, one of ordinary skill in the art will recognize that the mechanisms of the illustrative embodiments are specifically implemented in computer technology and that this computer technology may take many different forms depending on the particular implementation desired. The hardware of this computer technology is specifically configured through software and data resources to provide the various elements of one or more of the illustrative embodiments, such as the machine learning computer models, the UCW joint multimodal fusion engine, the joint multimodal fusion computer model architecture, and the like. Thus, the configured computing technology is not generic computing technology but is specifically configured in the particular way necessary to implement these elements and the particular improved computer functionality described herein. The following figures provide examples of computing environments in which these specially configured improved computing tools may be implemented.

Figure 5:
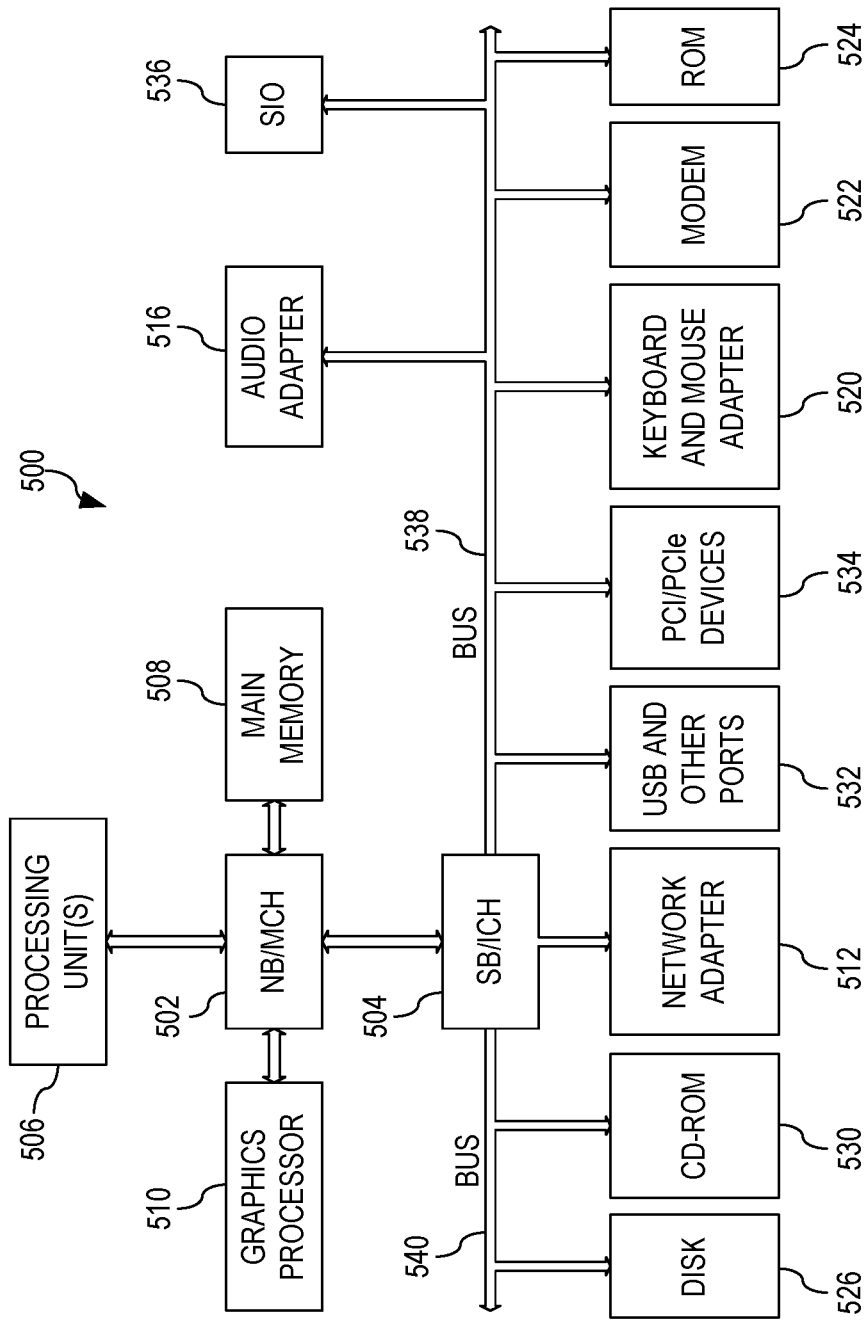
FIG. 5 is an example block diagram of a computing device in which aspects of the illustrative embodiments may be implemented.

That is, the illustrative embodiments may be utilized in many different types of data processing environments. In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement a joint multimodal fusion computer model architecture 190 in accordance with one or more illustrative embodiments, which includes machine learning computer models 140-160 for various modalities of data and the UCW joint multimodal fusion engine 170 which generates the fused output using the weight vector data structure determined through evaluation of model uncertainty and pairwise modality correlations as described previously. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein above, the implementation of the mechanisms of the illustrative embodiments improves the functionality of the computing device and provides a useful and concrete result that facilitates an improved fusion of predictions from machine learning computer models processing different modality data. That is, the same or different computing systems, e.g., server 406, clients 412 and 414, etc., may provide different datasets of different modalities, e.g., the computing systems may operate as different modality source computing systems 102-104. The various datasets of different modalities may be provided to the joint multimodal fusion computer model architecture 190 for processing in accordance with one or more of the illustrative embodiments previously described above with regard to FIGS. 1-3. In some cases, a user of a computing system, such as client computing device 410, may issue a request to a service provided by server 404 for performance of an operation based on the multimodal data from the various source computing systems 102-104, e.g., a request to evaluate a patient with regard to a particular risk of an event occurring, such as hospitalization, amputation, or the like. The request may be received by the server 404 which may then invoke the mechanisms of one or more of the illustrative embodiments to perform an uncertainty and correlation weighted joint multimodal fusion operation to generate a fused output prediction that is then provided back to the client computing device 410.

This is just one example of how the mechanisms of the illustrative embodiments may be implemented using a distributed data processing system such as shown in FIG. 4. A distributed data processing system is not required, and other implementations may use other configurations and separations of functionality different from that depicted in FIG. 4 without departing from the spirit and scope of the present invention.

As noted above, the mechanisms of the illustrative embodiments utilize specifically configured computing devices, or data processing systems, to perform the operations for performing an uncertainty and correlation weighted joint multimodal fusion operation using specific improved computing tool mechanisms. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System P® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the joint multimodal fusion computer model architecture, and more specifically with regard to the uncertainty and correlation weighted joint multimodal fusion engine of this joint multimodal fusion computer model architecture.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to configure the at least one processor to provide a joint multimodal fusion computer model architecture which executes the method, the method comprising:

receiving prediction output data from a machine learning (ML) computer model set comprising a plurality of different subsets of ML computer models, each subset of ML computer models in the ML computer model set operating on input data of a different modality than input data of other subsets of ML computer models in the ML computer model set, and each subset of ML computer models generating a plurality of different prediction output in the prediction output data;

fusing prediction outputs in the plurality of different prediction output data by executing an uncertainty and correlation weighted (UCW) joint multimodal fusion operation on the prediction output data to generate a fused output comprising a multimodal prediction output data, wherein the uncertainty and correlation weight(UCW) joint multimodal fusion operation comprises:

generating an uncertainty estimation for each subset of ML computer models;

generating a pairwise modality correlation matrix data structure where each entry in the pairwise modality correlation matrix data structure specifies at least one value indicating a degree of correlation between prediction outputs generated by pairings of subsets of ML computer models corresponding to the different modalities; and generate different weights for the prediction outputs corresponding to different subsets of ML computer models based on a function of the uncertainty estimations for each subset of ML computer models and the pairwise modality correlation matrix data structure;

applying the different weights to different ones of prediction outputs from the different subsets of ML computer models operating on input data of the different modalities;

and outputting the fused output comprising the multimodal prediction output data to a computing device, wherein the different weights are determined based on the function of the uncertainty estimation for each of the different subsets of ML computer models and an estimate of the pairwise modality correlation matrix data structure between the different modalities.

2. The method of claim 1, wherein the UCW joint multimodal fusion operation is a late fusion operation that weights each prediction output associated with each modality of input data according to the prediction output uncertainty such that more certain prediction outputs contribute more to the fused output, and adjusts the weights based on determined correlations between prediction outputs made across different modalities of input data.

3. The method of claim 1, further comprising:

for each modality of input data, independently training a plurality of non-deterministic ML computer models using a machine learning training operation and a same set of training data, to generate a plurality of trained ML computer models having different operational parameters, wherein the plurality of trained ML computer models for a given modality is the subset of ML computer models operating on input data of the given modality, and wherein outputs from the trained ML computer models for a given modality are aggregated to generate an output prediction for the subset of ML computer models corresponding to the given modality.

4. The method of claim 3, wherein each non-deterministic ML computer model in the plurality of non-deterministic ML computer models for a modality of input data have operational parameters that are randomly initialized such that the trained ML computer models have different operational parameters after being independently trained.

5. The method of claim 1, wherein generating the pairwise modality correlation matrix data structure comprises, for each subset of ML computer models operating on a different modality of input data: performing a deep ensemble operation on the subset of ML computer models based on a validation dataset; performing random sampling of output results of the deep ensemble operation; and generating an expected prediction error for the subset of ML computer models based on the random sampling of output results, wherein generating the pairwise modality correlation matrix data structure further comprises generating the pairwise modality correlation matrix data structure based on pairings of the expected prediction error values across different subsets of ML computer models associated with different modalities of input data.

6. The method of claim 1, wherein generating the weights for prediction outputs comprises generating the weights in accordance with the following formulae:

$$w^* = \frac{M^{-1} 1_K}{1_K^T M^{-1} 1_K}$$

where w* is a vector of weight values, each weight value being associated with a different subset of ML computer models processing input data of a different modality, M is a matrix of correlation values specified in the pairwise modality correlation matrix data structure, $1_K$ is a vector of size K where each of the values in the vector is a 1, and T is matrix transpose.

7. The method of claim 6, wherein the correlation values specified in the pairwise modality correlation matrix data structure are determined according to the following formulae:

$$M[k_1, k_2] = \sum_j e\left(t_j^{k_1}, D^{k_1}, U^{k_1}\right) e\left(t_j^{k_2}, D^{k_2}, U^{k_2}\right)$$

where M[ ] is the correlation value for an entry in the pairwise modality correlation matrix data structure for a pairing of a first modality of input data $k_1$ and a second modality of input data $k_2$ in a set of K different modalities of input data, $e(t_j^k, D^k, U^k)$ is the expected prediction error produced for testing data $t_j$ of a kth modality of input data, $D^k$ is training data of a kth modality of input data, and $U^k$ is the subset of ML computer models for a kth modality of input data.

8. The method of claim 1, wherein the different modalities of input data are different modalities of medical images corresponding to different medical image capture technologies.

9. The method of claim 8, wherein the different modalities of medical images comprises magnetic resonance imaging technology, computed tomography imaging technology, x-ray imaging technology, and sonogram imaging technology.

10. A computer program product comprising a computer readable storage medium having a computer readable program stored therein, wherein the computer readable program, when executed on a data processing system, causes the data processing system to be configured to provide a joint multimodal fusion computer model architecture which operates to:

receive prediction output data from a machine learning (ML) computer model set comprising a plurality of different subsets of ML computer models, each subset of ML computer models in the ML computer model set operating on input data of a different modality than input data of other subsets of ML computer models in the ML computer model set, and each subset of ML computer models generating a plurality of different prediction output in the prediction output data;

fuse prediction outputs in the plurality of different prediction output data by executing an uncertainty and correlation weighted (UCW) joint multimodal fusion operation on the prediction output data to generate a fused output comprising a multimodal prediction output data, wherein the uncertainty and correlation weight(UCW) joint multimodal fusion operation comprises: generating an uncertainty estimation for each subset of ML computer models; generating a pairwise modality correlation matrix data structure where each entry in the pairwise modality correlation matrix data structure specifies at least one value indicating a degree of correlation between prediction outputs generated by pairings of subsets of ML computer models corresponding to the different modalities; and generate different weights for the prediction outputs corresponding to different subsets of ML computer models based on a function of the uncertainty estimations for each subset of ML computer models and the pairwise modality correlation matrix data structure; applying the different weights to different ones of prediction outputs from the different subsets of ML computer models operating on input data of the different modalities; and output the fused output comprising the multimodal prediction output data to a computing device, wherein the different weights are determined based on the function of the uncertainty estimation for each of the different subsets of ML computer models and an estimate of the pairwise modality correlation matrix data structure between the different modalities.

11. The computer program product of claim 10, wherein the UCW joint multimodal fusion operation is a late fusion operation that weights each prediction output associated with each modality of input data according to the prediction output uncertainty such that more certain prediction outputs contribute more to the fused output, and adjusts the weights based on determined correlations between prediction outputs made across different modalities of input data.

12. The computer program product of claim 10, wherein the computer readable program further causes the joint multimodal fusion computer model architecture of the data processing system to:

for each modality of input data, independently training a plurality of non-deterministic ML computer models using a machine learning training operation and a same set of training data, to generate a plurality of trained ML computer models having different operational parameters, wherein the plurality of trained ML computer models for a given modality is the subset of ML computer models operating on input data of the given modality, and wherein outputs from the trained ML computer models for a given modality are aggregated to generate an output prediction for the subset of ML computer models corresponding to the given modality.

13. The computer program product of claim 12, wherein each non-deterministic ML computer model in the plurality of non-deterministic ML computer models for a modality of input data have operational parameters that are randomly initialized such that the trained ML computer models have different operational parameters after being independently trained.

14. The computer program product of claim 10, wherein generating the pairwise modality correlation matrix data structure comprises, for each subset of ML computer models operating on a different modality of input data: performing a deep ensemble operation on the subset of ML computer models based on a validation dataset; performing random sampling of output results of the deep ensemble operation; and generating an expected prediction error for the subset of ML computer models based on the random sampling of output results, wherein generating the pairwise modality correlation matrix data structure further comprises generating the pairwise modality correlation matrix data structure based on pairings of the expected prediction error values across different subsets of ML computer models associated with different modalities of input data.

15. The computer program product of claim 10, wherein generating the weights for prediction outputs comprises generating the weights in accordance with the following formulae:

$$w^* = \frac{M^{-1} 1_K}{1_K^T M^{-1} 1_K}$$

where w* is a vector of weight values, each weight value being associated with a different subset of ML computer models processing input data of a different modality, M is a matrix of correlation values specified in the pairwise modality correlation matrix data structure, $1_K$ is a vector of size K where each of the values in the vector is a 1, and T is a testing data set.

16. The computer program product of claim 15, wherein the correlation values specified in the pairwise modality correlation matrix data structure are determined according to the following formulae:

$$M[k_1, k_2] = \sum_j e\left(t_j^{k_1}, D^{k_1}, U^{k_1}\right) e\left(t_j^{k_2}, D^{k_2}, U^{k_2}\right)$$

where M[ ] is the correlation value for an entry in the pairwise modality correlation matrix data structure for a pairing of a first modality of input data $k_1$ and a second modality of input data $k_2$ in a set of K different modalities of input data, $e(t_j^k, D^k, U^k)$ is the expected prediction error produced for testing data $t_j$ of a kth modality of input data, $D^k$ is training data of a kth modality of input data, and $U^k$ is the subset of ML computer models for a kth modality of input data.

17. The computer program product of claim 10, wherein the different modalities of input data are different modalities of medical images corresponding to different medical image capture technologies.

18. An apparatus comprising:
at least one processor; and at least one memory coupled to the at least one processor, wherein the at least one memory comprises instructions which, when executed by the at least one processor, cause the at least one processor to be configured to provide a joint multimodal fusion computer model architecture which operates to:
receive prediction output data from a machine learning (ML) computer model set comprising a plurality of different subsets of ML computer models, each subset of ML computer models in the ML computer model set operating on input data of a different modality than input data of other subsets of ML computer models in the ML computer model set,
and each subset of ML computer models generating a plurality of different prediction output in the prediction output data; fuse prediction outputs in the plurality of different prediction output data by executing an uncertainty and correlation weighted (UCW) joint multimodal fusion operation on the prediction output data to generate a fused output comprising multimodal prediction output data, wherein the uncertainty and correlation weight(UCW) joint multimodal fusion operation comprises:
generating an uncertainty estimation for each subset of ML computer models;
generating a pairwise modality correlation matrix data structure where each entry in the pairwise modality correlation matrix data structure specifies at least one value indicating a degree of correlation between prediction outputs generated by pairings of subsets of ML computer models corresponding to the different modalities; and generate different weights for the prediction outputs corresponding to different subsets of ML computer models based on a function of the uncertainty estimations for each subset of ML computer models and the pairwise modality correlation matrix data structure; applying the different weights to different ones of prediction outputs from the different subsets of ML computer models operating on input data of the different modalities; and output the fused output comprising the multimodal prediction output data to a computing device, wherein the different weights are determined based on [an} the function of the uncertainty estimation for each of the different subsets of ML computer models and an estimate of the pairwise modality correlation matrix data structure between the different modalities.

* * * * *